US011912068B2

United States Patent
Knispel et al.

(10) Patent No.: US 11,912,068 B2
(45) Date of Patent: Feb. 27, 2024

(54) TYRE

(71) Applicant: Sumitomo Rubber Industries, Ltd., Kobe (JP)

(72) Inventors: Oliver Knispel, Kobe (JP); Daniel Kunkel, Kobe (JP); Jaap Leendertse, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/665,658

(22) Filed: Feb. 7, 2022

(65) Prior Publication Data
US 2022/0258539 A1 Aug. 18, 2022

(30) Foreign Application Priority Data

Feb. 12, 2021 (EP) .................................... 21156882

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 11/1204* (2013.01); *B60C 11/1236* (2013.01); *B60C 2011/1213* (2013.01)

(58) Field of Classification Search
CPC ............ B60C 11/0304; B60C 11/0306; B60C 11/1204; B60C 11/1236;
(Continued)

(56) References Cited

U.S. PATENT DOCUMENTS 5,660,651 A * 8/1997 Diensthuber ......... B60C 11/033
152/DIG. 3
6,105,644 A * 8/2000 Ikeda .................. B60C 11/0302
152/209.8
(Continued)

FOREIGN PATENT DOCUMENTS

DE 2650327 A1 5/1978
DE 4232308 A1 3/1994
(Continued)

OTHER PUBLICATIONS

Baumgarten, English Machine Translation of DE 4232308, 1994 (Year: 1994).*
(Continued)

*Primary Examiner* — Justin R Fischer
*Assistant Examiner* — Brendon Charles Darby
(74) *Attorney, Agent, or Firm* — XSENSUS LLP

(57) ABSTRACT

A tyre comprising a tread portion comprising first and second tread edges, a crown groove extending continuously in a tyre circumferential direction in a crown portion of the tyre, a first land portion between the first tread edge and the crown groove, and a second land portion extending from the crown groove towards the second tread edge. The first land portion is provided with first lateral grooves connected to the crown groove and extending from the crown groove in the direction to the first tread edge, and the second land portion is provided with second lateral grooves connected to the crown groove and extending from the crown groove in the direction to the second tread edge. The first land portion is divided into first blocks by the crown groove and the first lateral grooves, and the second land portion is divided into second blocks by the crown groove and the second lateral grooves.

18 Claims, 1 Drawing Sheet

(58) Field of Classification Search
CPC ..... B60C 2011/1213; B60C 2011/0346; B60C 2011/0344; B60C 11/0302; B60C 11/1369; B60C 2011/0353; B60C 11/125
See application file for complete search history.

(56) References Cited

U.S. PATENT DOCUMENTS

| | | | |
|---|---|---|---|
| 2002/0100526 A1* | 8/2002 | Matsumoto | B60C 11/1392 152/209.18 |
| 2013/0020001 A1* | 1/2013 | Nishi | B60C 11/0309 152/209.18 |
| 2016/0250897 A1* | 9/2016 | Fujioka | B60C 11/0306 152/209.23 |

FOREIGN PATENT DOCUMENTS

| | | | | |
|---|---|---|---|---|
| WO | WO-2015086182 A1 * | 6/2015 | ......... | B60C 11/1315 |
| WO | WO-2018103924 A1 * | 6/2018 | ......... | B60C 11/0302 |

OTHER PUBLICATIONS

Diensthuber, English Machine Translation of WO 2015/086182, 2015 (Year: 2015).*
Brandau, English Machine Translation of WO 2018/103924 (Year: 2018).*

* cited by examiner

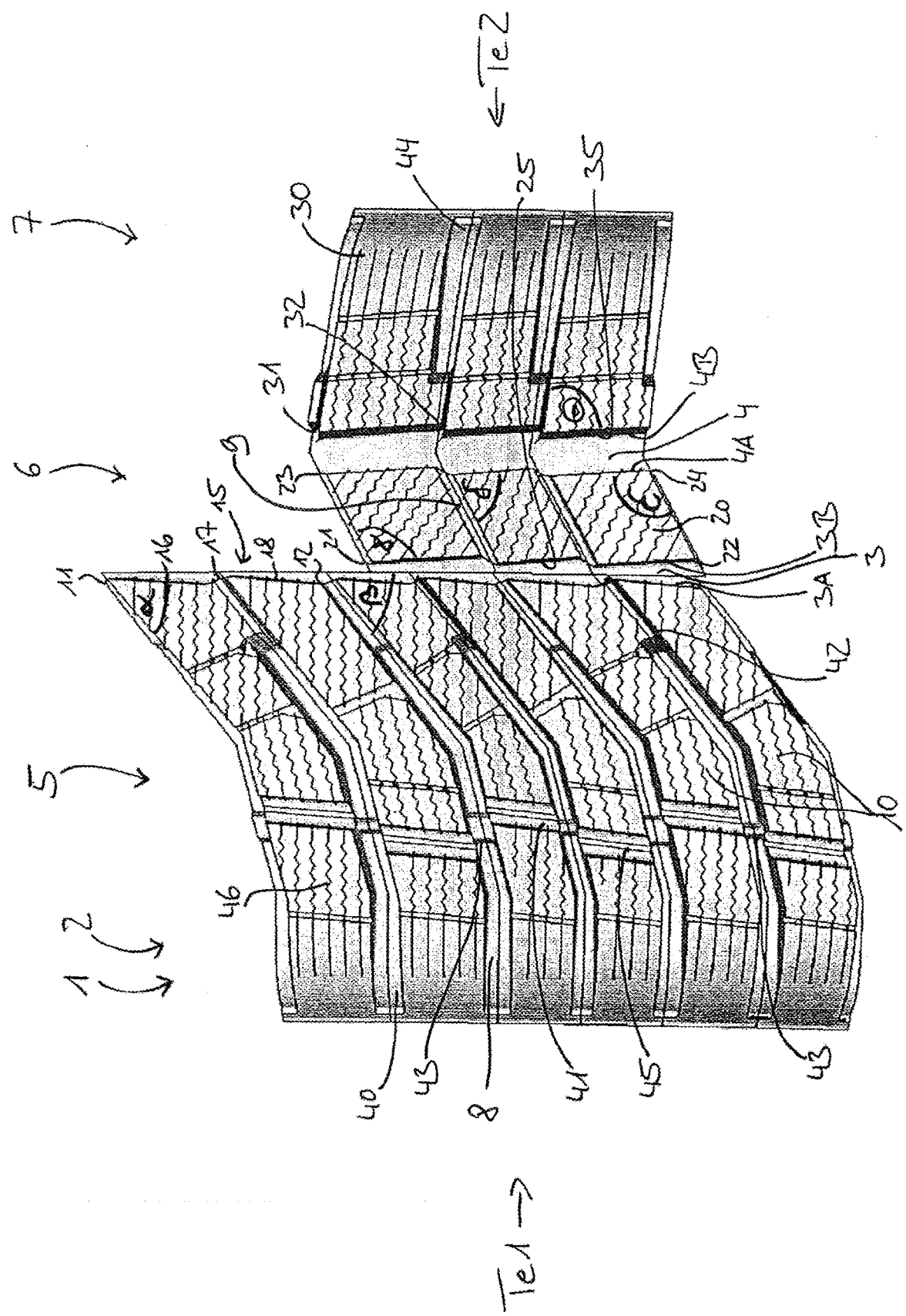

TYRE

CROSS REFERENCE TO RELATED APPLICATION

The present application claims priority to European patent application EP 21156882.9, filed on Feb. 12, 2021, the entire contents of which is incorporated herein by reference in its entirety.

FIELD

The present disclosure relates to a tyre, in particular to a pneumatic tyre for driving under winter conditions.

BACKGROUND

When driving under winter conditions, pneumatic tyres capable of exerting excellent on-snow performance as well as excellent handling stability on wet roads are required.

There remains a need for an improved pneumatic tyre having an excellent performance and excellent handling stability when driving on snow surfaced and wet roads.

SUMMARY

A first aspect of the present disclosure provides a tyre comprising a tread portion comprising a first tread edge and a second tread edge, a crown groove extending continuously in a tyre circumferential direction in a crown portion of the tyre, a first land portion defined between the first tread edge and the crown groove, a second land portion extending from the crown groove towards the second tread edge, wherein the first land portion is provided with a plurality of first lateral grooves connected to the crown groove and extending from the crown groove in a first direction to the first tread edge, the second land portion is provided with a plurality of second lateral grooves connected to the crown groove and extending from the crown groove in a second direction to the second tread edge, the first land portion is divided into a plurality of first blocks by the crown groove and the plurality of first lateral grooves, the second land portion is divided into a plurality of second blocks by the crown groove and the plurality of second lateral grooves, each of the first blocks has a first edge and a second edge located at the intersections of the crown groove and the first lateral grooves defining the respective block, and a lateral wall extending from the first edge to the second edge and forming part of a first lateral wall of the crown groove, each of the second blocks has a first edge and a second edge located at the intersections of the crown groove and the second lateral grooves defining the respective block, and a lateral wall extending from the first edge to the second edge and forming part of a second lateral wall of the crown groove, the first edge of the first block circumferentially faces to a same direction as the first edge of the second block, a first angle between the first lateral wall of the crown groove and the first lateral groove at each of the first edges of the first blocks is an acute angle, a second angle between the second lateral wall of the crown groove and the second lateral groove at each of the first edges of the second blocks is an obtuse angle, the first edge of each of the first blocks has a first larger axial distance from the first tread edge than the second edge of the respective first block, and the first edge of each of the second blocks has a second larger axial distance from the second tread edge than the second edge of the respective second block.

According to one or more embodiment of the present disclosure, the crown groove can extend continuously at least substantially positioned at an axial center of the tyre.

According to one or more embodiments of the present disclosure, the first lateral wall of the crown groove can be inclined in a first inclined direction with respect to the tyre circumferential direction. The second lateral wall of the crown groove can be inclined in a second inclined direction opposite to the first inclined direction with respect to the tyre circumferential direction.

According to one or more embodiments of the present disclosure, the lateral wall of each of the first blocks forming part of the first lateral wall of the crown groove can comprise three segments including a first segment adjacent to the first edge, a third segment adjacent to the second edge and a second segment extending between the first segment and the third segment, the first segment and the third segment can be inclined in the first inclined direction with respect to the tyre circumferential direction, and the second segment can be inclined in the second inclined direction opposite to the first inclined direction with respect to the tyre circumferential direction.

According to one or more embodiments of the present disclosure, the intersection of the first segment and second segment can be located at a smaller axial distance from the first tread edge than the intersection of the second segment and the third segment.

According to one or more embodiments of the present disclosure, the first angle between the first lateral wall of the crown groove and the first lateral groove at each of the first edges of the first blocks can be within a first range from 30 to 55 degrees and/or the second angle between the second lateral wall of the crown groove and the second lateral groove at each of the first edges of the second blocks can be within a second range from 110 to 140 degrees.

According to one or more embodiments of the present disclosure, the first angle with respect to the tyre circumferential direction of the first lateral groove at each of the first edges of the first blocks can be within a range between 30 and 65 degrees.

According to one or more embodiments of the present disclosure, the tread portion can further comprise an outer groove extending continuously in the tyre circumferential direction between the crown groove and the second tread edge, and the outer groove can define outer lateral walls in the tyre axial direction of the plurality of second blocks, forming a first lateral wall of the outer groove. According to one or more embodiments of the present disclosure, the second blocks can each have a third edge and a fourth edge located at the intersections of the outer groove and the second lateral grooves defining each second block, wherein third angle between the outer groove and the second lateral groove at each of the third edges can be an acute angle, a fourth angle between the outer groove and the second lateral groove at each of the fourth edges can be an obtuse angle, and the third edge can be located on a third larger axial distance from the second tread edge than the fourth edge.

According to one or more embodiments of the present disclosure, the third edges of the second blocks can circumferentially face to a same direction as the first edges of the second blocks.

A second aspect of embodiments of the present disclosure, which can be combined with the first aspect, provides a tyre comprising a tread portion, the tread portion comprising a first tread edge and a second tread edge, a first land portion next to the first tread edge and a second land portion next to the first land portion, wherein the first land portion can comprise a plurality of lateral grooves extending in a first direction from the first tread edge to the second tread edge and a plurality of connecting grooves each connecting two lateral grooves located adjacent to each other in a tyre circumferential direction, the plurality of connecting grooves can include first pairs of circumferentially adjacent connecting grooves having at least a partial overlap in the tyre circumferential direction, and second pairs of circumferentially adjacent connecting grooves not overlapping with each other in the tyre circumferential direction, wherein overlapping pairs and not overlapping pairs of connecting grooves can be alternately arranged in the tyre circumferential direction.

According to one or more embodiments of the present disclosure, the connecting grooves can be provided with crown sipes extending along a reference line of the connecting grooves.

According to one or more embodiments of the present disclosure, the plurality of first lateral grooves can cross the first land portion completely and the first land portion comprising a plurality of third lateral grooves extending in the direction from the crown groove to the first tread edge, but may not be connected to the crown groove.

According to one or more embodiments of the present disclosure, the plurality of first lateral grooves and third lateral grooves can be arranged alternatingly with each other in the tyre circumferential direction.

According to one or more embodiments of the present disclosure, each of the first blocks can be provided with pairs of connecting grooves connecting first lateral grooves and third lateral grooves located adjacent in the tyre circumferential direction. The pairs of connecting grooves provided in each of the first blocks can be pairs of overlapping connecting grooves.

According to one or more embodiments of the present disclosure, the plurality of third lateral grooves can be connected to the crown groove via lateral grooves having a width smaller than the width of the third lateral grooves.

According to one or more embodiments of the present disclosure, the first lateral grooves can be provided with tie bars, the tie bars can protrude from a bottom of the first lateral groove, extend along the groove width direction, and connect the sidewalls of the first lateral grooves.

According to one or more embodiments of the present disclosure, tie bars can be provided at the position where the connecting grooves are connected to the first lateral groove.

According to one or more embodiments of the present disclosure, the tread portion can further comprise a third land portion defined between the outer groove and the second tread edge, wherein the third land portion can be provided with a plurality of fourth lateral grooves connected to the outer groove and extending from the outer groove in the direction to the second tread edge, the third land portion can be divided into a plurality of third blocks by the outer groove and the plurality of fourth lateral grooves, each of the third blocks can have a first edge and a second edge located at the intersections of the outer groove and the fourth lateral grooves defining the respective block, and a lateral wall extending from the first edge to the second edge and forming a lateral wall of the outer groove, the first edge of the third block can circumferentially face to a same direction as the first edge of the first block and the first edge of the second block, an angle between the lateral wall of the outer groove and the third lateral groove at each of the first edges of the third blocks can be an acute angle, and the first edge of each of the third blocks can have a larger axial distance from the second tread edge than the second edge of the respective third block.

According to one or more embodiments of the present disclosure, the first lateral grooves can be provided with a plurality of different pitches between circumferentially adjacent grooves and/or the second lateral grooves can be provided with a plurality of different pitches between circumferentially adjacent grooves.

According to one or more embodiments of the present disclosure, the first blocks and/or the second blocks and/or the third blocks can be provided with sipes.

According to one or more embodiment of the present disclosure, an orientation of the tread portion when the tyre is mounted on a vehicle can be specified, the first tread edge can be an inner tread edge located on an inner side of the vehicle when the tyre is mounted on the vehicle, and the second tread edge can be an outer tread edge located on an outer side of the vehicle, when the tyre is mounted on the vehicle.

BRIEF DESCRIPTION OF THE DRAWINGS

The FIGURE shows a developed view of a tread portion of a tyre according to one or more embodiments of the present disclosure.

DETAILED DESCRIPTION

The FIGURE shows a developed view of a tread portion 2 of a tyre 1 according to one or more embodiments of the disclosure. The tread portion 2 can comprise a first tread edge Te1 and a second tread edge Te2. Each of the first tread edge Te1 and the second tread edge Te2 can be a ground contact position at the outermost side in the tyre axial direction when a normal load is applied to the tyre 1 in a normal state and the tyre 1 is brought into contact with a flat surface at a camber angle of 0°.

The normal state can be referred to or characterized as a state where the tyre is mounted to a normal rim and inflated to a normal internal pressure and no load is applied to the tyre. In the present disclosure, unless otherwise specified, dimensions and the like of components of the tyre can be values measured in the normal state.

The "normal rim" can be referred to or characterized as a rim that is defined, in a standard system including a standard on which the tyre is based, by the standard for each tyre, and is, for example, the "standard rim" in the JATMA standard, the "Design Rim" in the TRA standard, or the "Measuring Rim" in the ETRTO standard. The "normal internal pressure" can be referred to or characterized as an air pressure that is defined, in a standard system including a standard on which the tyre is based, by the standard for each tyre, and is the "maximum air pressure" in the JATMA standard, the maximum value indicated in the table "TYRE LOAD LIMITS AT VARIOUS COLD INFLATION PRESSURES" in the TRA standard, or the "INFLATION PRESSURE" in the ETRTO standard. The "normal load" can be referred to or characterized as a load that is defined, in a standard system including a standard on which the tyre is based, by the standard for each tyre, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

In the present embodiment, an orientation of the tread portion when the tyre 1 is mounted on a vehicle can be specified. Thereby, the first tread edge Te1 can be an inner tread edge located on an inner side of the vehicle when the tyre is mounted on the vehicle, and the second tread edge Te2 can be an outer tread edge located on an outer side of the vehicle, when the tyre is mounted on the vehicle.

The tread portion 2 can include a crown groove 3 continuously extending in the tyre circumferential direction, and an outer groove 4 continuously extending in the tyre circumferential direction at a smaller axial distance to the second tread edge Te2 than the crown groove 3. The crown groove 3 and the outer groove 4 can divide the tread portion 2 into a first land portion 5 between the first tread edge Te1 and the crown groove 3, a second land portion 6 between the crown groove 3 and the outer groove 4, and a third land portion 7 between the outer groove 4 and the second tread edge Te2.

The first land portion 5 can be provided with a plurality of first lateral grooves 8 connected to the crown groove 3 and extending from the crown groove 3 in the direction to the first tread edge Te1. The second land portion 6 can be provided with a plurality of second lateral grooves 9 extending from the crown groove 3 in the direction to the second tread edge Te2 and connecting to the crown groove 3 and the outer groove 4.

The first land portion 5 can be divided into a plurality of first blocks 10 by the crown groove 3 and the plurality of first lateral grooves 8. The second land portion 6 can be divided into a plurality of second blocks 20 by the crown groove 3, the outer groove 4, and the plurality of second lateral grooves 9.

The crown groove 3 can comprise a first lateral wall 3A and a second lateral wall 3B. The outer groove 4 can comprise a first lateral wall 4A and a second lateral wall 4B.

The first lateral wall 3A of the crown groove 3 can be inclined in a first direction toward the first tread edge Te1 with respect to the circumferential direction, whereas the second lateral wall 3B of the crown groove 3 can be inclined in a second direction opposite to the first direction. The crown groove 3 can therefore have a varying groove width along the circumferential direction.

Each of the first blocks 10 can have a first edge 11 and a second edge 12 located at the intersections of the crown groove 3 and the first lateral grooves 8 defining the respective block 10, and a lateral wall 15 extending from the first edge 11 to the second edge 12 and forming part of a first lateral wall 3A of the crown groove 3. Each of the second blocks 20 can have a first edge 21 and a second edge 22 located at the intersections of the crown groove 3 and the second lateral grooves 9 defining the respective block 20, and a lateral wall 25 extending from the first edge 21 to the second edge 22 and forming part of a second lateral wall 3B of the crown groove 3.

The second blocks 20 can furthermore each have a third edge 23 and a fourth edge 24 located at the intersections of the outer groove 4 and the second lateral grooves 9 defining each second block 20, wherein the third edge 23 can be located on a larger axial distance from the second tread edge Te2 than the fourth edge 24. Thereby, the third edges 23 of the second blocks 20 can circumferentially face to the same direction as the first edges 21 of the second blocks 20.

The first edge 11 of the first block 10 can circumferentially face to the same direction as the first edge 21 of the second block 20. Thereby, the first edge 11 of each of the first blocks 10 can have a larger axial distance from the first tread edge Te1 than the second edge 12 of the respective first block 10, and the first edge 21 of each of the second blocks 20 can have a larger axial distance from the second tread edge Te2 than the second edge 22 of the respective second block 20.

An angle α between the first lateral wall 3A of the crown groove 3 and the first lateral groove 8 at each of the first edges 11 of the first blocks 10 can be an acute angle, and an angle γ between the second lateral wall 3B of the crown groove 3 and the second lateral groove 9 at each of the first edges 21 of the second blocks 20 can be an obtuse angle.

As the first edges 11 can extend freely into the crown groove 3 and form an acute angle α, the first edges 11 can be able to scrape easier into the snow when driving on a snow surfaced road. This can lead to a better grip when the tyre 1 may tend to slip. By their higher ability to be deformed, the first edges 11 of the first blocks 10 can furthermore reduce the stiffness of the respective blocks 10, which can lead to a higher ground pressure.

The second blocks 20 can lead to an even better grip when the tyre 1 may tend to slip and thus to an improved traction on snow surfaced roads.

The angle α between the first lateral wall 3A of the crown groove 3 and the first lateral groove 8 at each of the first edges 11 of the first blocks 10 can be within a range from 30 to 55 degrees. The angle γ between the second lateral wall 3B of the crown groove 3 and the second lateral groove 9 at each of the first edges 21 of the second blocks 20 can be within a range from 110 to 140 degrees.

An angle δ between the outer groove 4 and the second lateral groove 9 at each of the third edges can be an acute angle. An angle ε between the outer groove 4 and the second lateral groove 9 at each of the fourth edges 24 can be equal to the angle γ between the second lateral wall 3B of the crown groove 3 and the second lateral groove 9 at each of the first edges 21 of the second blocks 20. An angle β with respect to the tyre circumferential direction of the first lateral groove 8 at each of the first edges 11 of the first blocks 10 can be within a range between 30 and 65 degrees.

The lateral wall 15 of each of the first blocks 10 forming part of the first lateral wall 3A of the crown groove 3 can comprise three segments including a first segment 16 adjacent to the first edge 11, a third segment 18 adjacent to the second edge 12 and a second segment 17 extending between the first segment 16 and the third segment 18. The first segment 16 and the third segment 18 can be inclined in the first direction with respect to the tyre circumferential direction, and the second segment 17 can be inclined in a second direction opposite to the first direction with respect to the tyre circumferential direction. The intersection of the first segment 16 and the second segment 17 can be located at a smaller axial distance from the first tread edge Te1 than the intersection of the second segment 17 and the third segment 18.

The second segments 17 can lead to a better grip when the tyre 1 may tend to slip and thus can lead to an improved traction on snow surfaced roads.

The first land portion 5 can comprise a plurality of third lateral grooves 40 extending in the direction from the crown groove 3 to the first tread edge Te1, but may not be connected to the crown groove 3. The plurality of first lateral grooves 8 and third lateral grooves 40 can be arranged alternatingly with each other in the tyre circumferential direction. The first land portion 5 can furthermore comprise a plurality of connecting grooves 41 each connecting a first lateral groove 8 and a third lateral groove 40 located adjacent to each other in the tyre circumferential direction.

The plurality of connecting grooves 41 can include pairs of circumferentially adjacent connecting grooves 41 having at least a partial overlap in the tyre circumferential direction, and pairs of circumferentially adjacent connecting grooves 41 not overlapping with each other in the tyre circumferential direction, wherein overlapping pairs and not overlapping pairs of connecting grooves 41 can be alternately arranged in the tyre circumferential direction. Thereby, each of the first blocks 10 can comprise pairs of connecting grooves 41 connecting first lateral grooves 8 and third lateral grooves 40 located adjacent in the tyre circumferential direction.

The pairs of overlapping connecting grooves 41 can lead to a softer stiffness and a high edge ground pressure in the respective area of the first tread portion 5. As a consequence, edges at the intersections between the first lateral grooves 8 and the connecting grooves 41 and edges at the intersections between the third lateral grooves 40 and the connecting grooves 41 can scratch easier to the snow surface which can lead to a better grip when driving on a snow surfaced road.

The first lateral grooves 8 and the third lateral grooves 41 can efficiently drain water which can help prevent or minimize the occurrence of aquaplaning and can improve the performance and handling stability on wet road surfaces.

In the present embodiment, the connecting grooves 41 can be provided with central sipes 45 extending along a reference line of the connecting grooves 41.

The central sipes 45 can soften the stiffness of the first land portion 5, which can further enhance the grip when driving on a snow surfaced road. The central sipes 45 can furthermore provide a pair of additional edges along a groove bottom of the respective connecting groove. This pair of additional edges can provide additional grip when the tyre 1 is worn.

Further sipes 46 may be provided in the first blocks 10 and/or the second blocks 20 and/or the third blocks 30 to improve the winter performance of the tyre 1.

The first land portion 5 may furthermore comprise lateral grooves 42 connecting the third lateral grooves 40 to the crown groove 3 and having a width smaller than the width of the third lateral grooves 40. Such lateral grooves 42 can further improve the drainage of water and enhance the performance on wet road surfaces.

In the present embodiment, the first lateral grooves 8 can be provided with tie bars 43. The tie bars 43 can protrude from a bottom of the first lateral groove 8, extending along the groove width direction, and connecting the sidewalls of the first lateral groove 8. The tie bars 43 may in particular be provided at the position where the connecting grooves 41 are connected to the first lateral groove 8. Such tie bars 41 can provide a better grip and improve the on-snow performance and the braking performance of the tyre 1.

In the present embodiment, the first lateral grooves 8 can be provided with a plurality of different pitches between circumferentially adjacent grooves. Similarly, also the second lateral grooves 9 can be provided with a plurality of different pitches between circumferentially adjacent grooves.

Such an arrangement of pitches can improve the noise characteristics of the tyre.

In the present embodiment, the third land portion 7 can be provided with a plurality of fourth lateral grooves 44 connected to the outer groove 4 and extending from the outer groove 4 in the direction to the second tread edge Te2. The third land portion 7 can be divided into a plurality of third blocks 30 by the outer groove 4 and the plurality of fourth lateral grooves 44. Each of the third blocks 30 can have a first edge 31 and a second edge 32 located at the intersections of the outer groove 4 and the fourth lateral grooves 44 defining the respective block. A lateral wall 35 of the third block 30 can extend from the first edge 31 to the second edge 32 and can form part of the second lateral wall 4B of the outer groove 4. The first edge 31 of the third block 30 can circumferentially face to the same direction as the first edge 11 of the first block 10 and the first edge 21 of the second block 20. An angle θ between the second lateral wall 4B of the outer groove 4 and the fourth lateral groove 44 at each of the first edges 31 of the third blocks 30 can be an acute angle. The first edge 31 of each of the third blocks 30 can have a larger axial distance from the second tread edge Te2 than the second edge 32 of the respective third block 30.

According to one or more embodiments of the disclosed subject matter, better grip can be achieved when the tyre may tend to slip. As the first edges extend freely into the crown groove, they are able to scrape easier into the snow when driving on a snow surfaced road. Furthermore, as the first edges have a higher ability to be deformed, the stiffness of the respective blocks can be reduced, which can lead to a higher ground pressure.

The arrangement of second blocks can lead to an even better grip when the tyre may tend to slip, which can improve traction on snow surfaced roads.

The first lateral grooves and the second lateral grooves can efficiently drain water, which can help prevent or minimize the occurrence of aquaplaning and/or can improve the performance and handling stability on wet roads.

Arrangements according to one or more embodiments of the disclosed subject matter can lead to a better grip when the tyre tends to slip and thus can improve traction on snow surfaced roads. Certain angles according to one or more embodiments of the disclosed subject matter can provide an excellent performance on snow surfaced roads.

According to one or more embodiments of the disclosed subject matter, the pairs of overlapping connecting grooves can lead to a softer stiffness and a high edge ground pressure in the respective area of the first tread portion. As a consequence, edges at the intersections between the lateral grooves and the connecting grooves can scratch easier to the snow surface which can lead to a better grip when driving on a snow surfaced road.

The first lateral grooves and the third lateral grooves can efficiently drain water which can help prevent or minimize the occurrence of aquaplaning and improve the performance and handling stability on wet roads.

According to one or more embodiments of the disclosed subject matter, the sipes can soften the stiffness of the first land portion, which can further enhance the grip when driving on a snow surfaced road. The sipes can furthermore provide a pair of additional edges along a groove bottom of the respective connecting groove. This pair of additional edges can provide additional grip when the tyre is worn.

According to one or more embodiments of the disclosed subject matter, the tie bars can provide a better grip and improve the on-snow performance and the braking performance of the tyre.

An arrangement of pitches according to one or more embodiments, which can vary along the circumferential direction, can improve the noise characteristics of the tyre.

According to one or more embodiments, by the provision of sipes, the winter performance can be further improved.

The invention claimed is:

1. A tyre comprising a tread portion comprising:
   a first tread edge and a second tread edge,
   a crown groove extending continuously in a tyre circumferential direction in a crown portion of the tyre,
   a first land portion defined between the first tread edge and the crown groove, and a second land portion extending from the crown groove towards the second tread edge,
wherein
the first land portion is provided with a plurality of first lateral grooves connected to the crown groove and extending from the crown groove in a first direction to the first tread edge,
the second land portion is provided with a plurality of second lateral grooves connected to the crown groove and extending from the crown groove in a second direction to the second tread edge,
the first land portion is divided into a plurality of first blocks by the crown groove and the plurality of first lateral grooves,
the second land portion is divided into a plurality of second blocks by the crown groove and the plurality of second lateral grooves,
each of the first blocks has a first edge and a second edge located at the intersections of the crown groove and the first lateral grooves defining the respective block, and a lateral wall extending from the first edge to the second edge and forming part of a first lateral wall of the crown groove,
each of the second blocks has a first edge and a second edge located at the intersections of the crown groove and the second lateral grooves defining the respective block, and a lateral wall extending from the first edge to the second edge and forming part of a second lateral wall of the crown groove,
the first edge of the first block circumferentially faces to a same direction as the first edge of the second block,
a first angle between the first lateral wall of the crown groove and the first lateral groove at each of the first edges of the first blocks is an acute angle,
a second angle between the second lateral wall of the crown groove and the second lateral groove at each of the first edges of the second blocks is an obtuse angle,
the first edge of each of the first blocks has a first larger axial distance from the first tread edge than the second edge of the respective first block,
the first edge of each of the second blocks has a second larger axial distance from the second tread edge than the second edge of the respective second block,
the crown groove extends continuously at least substantially positioned at an axial center of the tyre,
the first lateral wall of the crown groove is inclined in a first inclined direction with respect to the tyre circumferential direction and the second lateral wall of the crown groove is inclined in a second inclined direction opposite to the first inclined direction with respect to the tyre circumferential direction,
the lateral wall of each of the first blocks forming part of the first lateral wall of the crown groove includes three segments including a first segment adjacent to the first edge, a third segment adjacent to the second edge, and a second segment extending between the first segment and the third segment,
the first segment and the third segment are inclined in the first inclined direction with respect to the tyre circumferential direction, and the second segment is inclined in the second direction opposite to the first inclined direction with respect to the tyre circumferential direction, and
the first lateral wall of the crown groove and the second lateral wall of the crown groove are continuous in the tyre circumferential direction.

2. The tyre according to claim 1, wherein the intersection of the first segment and the second segment is located at a smaller axial distance from the first tread edge than the intersection of the second segment and the third segment.

3. The tyre according to claim 1,
wherein the first angle between the first lateral wall of the crown groove and the first lateral groove at each of the first edges of the first blocks is within a first range from 30 to 55 degrees, and/or
wherein the second angle between the second lateral wall of the crown groove and the second lateral groove at each of the first edges of the second blocks is within a second range from 110 to 140 degrees, and/or
wherein a third angle with respect to the tyre circumferential direction of the first lateral groove at each of the first edges of the first blocks is within a third range between 30 and 65 degrees.

4. The tyre according to claim 1, wherein the tread portion further comprises an outer groove extending continuously in the tyre circumferential direction between the crown groove and the second tread edge, and the outer groove defines outer lateral walls in the tyre axial direction of the plurality of second blocks, forming a first lateral wall of the outer groove.

5. The tyre according to claim 4,
wherein the second blocks each have a third edge and a fourth edge located at the intersections of the outer groove and the second lateral grooves defining each second block,
wherein a third angle between the outer groove and the second lateral groove at each of the third edges is an acute angle, a fourth angle between the outer groove and the second lateral groove at each of the fourth edges is an obtuse angle, and the third edge is located on a third larger axial distance from the second tread edge than the fourth edge, and
wherein the third edges of the second blocks circumferentially face to a same direction as the first edges of the second blocks.

6. The tyre according to claim 1,
wherein the first land portion is next to the first tread edge and the second land portion is next to the first land portion,
wherein the first land portion includes a plurality of connecting grooves each connecting two lateral grooves of the first lateral grooves located adjacent to each other in the tyre circumferential direction,
wherein the plurality of connecting grooves includes first pairs of circumferentially adjacent connecting grooves having at least a partial overlap in the tyre circumferential direction, and second pairs of circumferentially adjacent connecting grooves not overlapping with each other in the tyre circumferential direction,
wherein the overlapping pairs and not overlapping pairs of connecting grooves are alternately arranged in the tyre circumferential direction, and
wherein the connecting grooves are provided with central sipes extending along a reference line of the connecting grooves.

7. The tyre according to claim 1,
wherein the first land portion is on one side of the crown groove and the second land portion is on the other side of the crown groove, and
wherein each of the plurality of first lateral grooves is continuous and non-linear, with multiple bend portions between the crown groove and the first tread edge.

8. A tyre comprising a tread portion comprising:
a first tread edge and a second tread edge,
a crown groove extending continuously in a tyre circumferential direction in a crown portion of the tyre,
a first land portion defined between the first tread edge and the crown groove, and
a second land portion extending from the crown groove towards the second tread edge,
wherein
the first land portion is provided with a plurality of first lateral grooves connected to the crown groove and extending from the crown groove in a first direction to the first tread edge,
the second land portion is provided with a plurality of second lateral grooves connected to the crown groove and extending from the crown groove in a second direction to the second tread edge,
the first land portion is divided into a plurality of first blocks by the crown groove and the plurality of first lateral grooves,
the second land portion is divided into a plurality of second blocks by the crown groove and the plurality of second lateral grooves,
the first land portion comprises a plurality of connecting grooves each connecting two first lateral grooves located adjacent to each other in the tyre circumferential direction,
the plurality of connecting grooves includes first pairs of circumferentially adjacent connecting grooves having at least a partial overlap in the tyre circumferential direction, and second pairs of circumferentially adjacent connecting grooves not overlapping with each other in the tyre circumferential direction,
the overlapping pairs and not overlapping pairs of connecting grooves are alternately arranged in the tyre circumferential direction,
the connecting grooves are provided with central sipes extending along a reference line of the connecting grooves,
the first blocks of the first land portion are on a first side of the crown groove and the second blocks of the second land portion are on a second side of the crown groove,
each of the plurality of first lateral grooves is continuous and non-linear, with multiple bend portions between the crown groove and the first tread edge, and
the crown groove is the only crown groove of the tyre.

9. The tyre according to claim 8, wherein the plurality of first lateral grooves crosses the first land portion completely and the first land portion comprising a plurality of third lateral grooves extending in the first direction from the crown groove to the first tread edge, but not being connected to the crown groove.

10. The tyre according to claim 9,
wherein the plurality of first lateral grooves and third lateral grooves are arranged alternatingly with each other in the tyre circumferential direction, and/or
wherein each of the first blocks is provided with pairs of connecting grooves connecting first lateral grooves and third lateral grooves located adjacent in the tyre circumferential direction, and/or
wherein the plurality of third lateral grooves is connected to the crown groove via lateral grooves having a width smaller than the width of the third lateral grooves.

11. The tyre according to claim 8,
wherein the first lateral grooves are provided with tie bars, the tie bars protruding from a bottom of the first lateral groove, extending along a groove width direction, and connecting the sidewalls of the first lateral groove, and
wherein, the tie bars are respectively provided at the position where the connecting grooves are connected to the first lateral groove.

12. The tyre according to claim 8,
wherein the tread portion further comprises a third land portion defined between an outer groove and the second tread edge,
wherein the third land portion is provided with a plurality of fourth lateral grooves connected to the outer groove and extending from the outer groove in the second direction to the second tread edge,
wherein the third land portion is divided into a plurality of third blocks by the outer groove and the plurality of fourth lateral grooves,
wherein each of the third blocks has a first edge and a second edge located at the intersections of the outer groove and the fourth lateral grooves defining the respective block, and a lateral wall extending from the first edge to the second edge and forming part of a second lateral wall of the outer groove,
wherein the first edge of the third block circumferentially faces to a same direction as a first edge of a first block and a first edge of a second block,
wherein an angle between the second lateral wall of the outer groove and the fourth lateral groove at each of the first edges of the third blocks is an acute angle, and
wherein the first edge of each of the third blocks has a larger axial distance from the second tread edge than the second edge of the respective third block.

13. The tyre according to claim 8,
wherein the first lateral grooves are provided with a plurality of different pitches between circumferentially adjacent grooves, and/or
wherein the second lateral grooves are provided with a plurality of different pitches between circumferentially adjacent grooves, and/or
wherein first blocks and/or second blocks and/or third blocks are provided with Sipes.

14. The tyre according to claim 8, wherein an orientation of the tread portion when the tyre is mounted on a vehicle is specified, the first tread edge is an inner tread edge located on an inner side of the vehicle when the tyre is mounted on the vehicle, and the second tread edge is an outer tread edge located on an outer side of the vehicle, when the tyre is mounted on the vehicle.

15. The tyre according to claim 8, wherein the multiple bend portions of each of the first lateral grooves increase in their respective angles relative to the crown groove going away from the crown groove, ultimately extending perpendicular to the tyre circumferential direction at the first tread edge.

16. The tyre according to claim 8,
wherein each of the first blocks has a lateral wall extending from the first edge to the second edge and forming part of a first lateral wall of the crown groove,
wherein each of the second blocks has a lateral wall extending from the first edge to the second edge and forming part of a second lateral wall of the crown groove, and
wherein the first lateral wall of the crown groove and the second lateral wall of the crown groove are continuous in the tyre circumferential direction.

17. A tyre comprising a tread portion comprising:
a first tread edge and a second tread edge,
a crown groove extending continuously in a tyre circumferential direction in a crown portion of the tyre,
a first land portion defined between the first tread edge and the crown groove,
a second land portion extending from the crown groove towards the second tread edge,
wherein
the first land portion is provided with a plurality of first lateral grooves connected to the crown groove and extending from the crown groove in a first direction to the first tread edge,
the second land portion is provided with a plurality of second lateral grooves connected to the crown groove and extending from the crown groove in a second direction to the second tread edge,
the first land portion is divided into a plurality of first blocks by the crown groove and the plurality of first lateral grooves,
the second land portion is divided into a plurality of second blocks by the crown groove and the plurality of second lateral grooves,
each of the first blocks has a first edge and a second edge located at the intersections of the crown groove and the first lateral grooves defining the respective block, and a lateral wall extending from the first edge to the second edge and forming part of a first lateral wall of the crown groove,
each of the second blocks has a first edge and a second edge located at the intersections of the crown groove and the second lateral grooves defining the respective block, and a lateral wall extending from the first edge to the second edge and forming part of a second lateral wall of the crown groove,
the first edge of the first block circumferentially faces to a same direction as the first edge of the second block,
a first angle between the first lateral wall of the crown groove and the first lateral groove at each of the first edges of the first blocks is an acute angle,
a second angle between the second lateral wall of the crown groove and the second lateral groove at each of the first edges of the second blocks is an obtuse angle,
the first edge of each of the first blocks has a first larger axial distance from the first tread edge than the second edge of the respective first block,
the first edge of each of the second blocks has a second larger axial distance from the second tread edge than the second edge of the respective second block,
the crown groove extends continuously at least substantially positioned at an axial center of the tyre,
the first angle between the first lateral wall of the crown groove and the first lateral groove at each of the first edges of the first blocks is within a first range from 30 to 55 degrees and/or the second angle between the second lateral wall of the crown groove and the second lateral groove at each of the first edges of the second blocks is within a second range from 110 to 140 degrees and/or a third angle with respect to the tyre circumferential direction of the first lateral groove at each of the first edges of the first blocks is within a third range between 30 and 65 degrees,
the first blocks of the first land portion are on a first side of the crown groove and the second blocks of the second land portion are on a second side of the crown groove, and
each of the plurality of first lateral grooves is continuous and non-linear, with multiple bend portions between the crown groove and the first tread edge.

18. The tyre according to claim 17,
wherein the first lateral wall of the crown groove and the second lateral wall of the crown groove are continuous in the tyre circumferential direction, and
wherein the crown groove is the only crown groove of the tyre.

* * * * *